United States Patent Office 2,710,844
Patented June 14, 1955

2,710,844

CELLULOSE DERIVATIVES STABILIZED WITH EPOXY CONDENSATION PRODUCTS

Mortimer S. Thompson, Lincroft, N. J., assignor to Hercules Powder Company, Wilmington, Del., a corporation of Delaware No Drawing. Application October 4, 1951,
Serial No. 249,799

9 Claims. (Cl. 260—13)

This invention relates to tough, fire-resistant, dimensionally stable, heat-stable plastic compositions and to a method for producing same. In a particular aspect this invention relates to cellulose acetate plastic compositions having improved flame-resistant and heat stability properties and to a method for preparing such plastic compositions.

Plastic articles made of cellulose acetate plastic compositions and other similar compositions have been made heretofore by molding processes which employ heat and pressure to form the desired product from such compositions. For example, shaped plastic articles may be made in the form of sheets, rods, tubes, and the like, formed by extruding the plastic composition through a hot forming die, and innumerable objects may result from the use of such procedures. Such objects as motor housings, electrically lighted ornaments, household articles, toiletry articles, toys, etc., can be formed by injection molding of the plastic compositions into suitable mold cavities at elevated temperatures and pressures. Also, similar articles can be formed by compression molding procedures using elevated temperatures and pressures. The articles that are formed by such procedures are generally made from molding powders. The usefulness of such articles is increased if they are tough, flame-resistant, dimensionally stable and heat-stable.

It has long been known that certain plasticizing materials, such as triphenyl phosphate, tricresyl phosphate and tributyl phosphate, impart fire or flame resistance to plastic compositions when these plasticizing materials are employed in a sufficient amount. However, these plasticizers exhibit disadvantages which make their use as sole plasticizing agents both undesirable and impractical, and in order to overcome these disadvantages it has been necessary to add supplementary plasticizers such as dimethyl phthalate, diethyl phthalate and glyceryl tripropionate. However, these supplementary plasticizers do not possess fire-resistant properties.

Halogenated aliphatic esters of phosphoric acid, for example, trichlorobutyl phosphate, tribromomethyl phosphate, trichloroethyl phosphate, and the like, have been employed to impart flame-resistant properties to plastic compositions, for example, cellulose acetate and the like. However, these esters possess poor stability to heat and this undesirable property is manifested in the plastic composition by a viscosity breakdown of that composition when it is subjected to compounding and fabricating procedures requiring the use of heat. Plastic articles containing trichloroethyl phosphate or other halogenated aliphatic phosphoric acid ester have failed in actual use because no stabilizer was used or any stabilizer employed was not present in a sufficient amount or because the stabilizer employed was not sufficiently effective to protect the plastic composition throughout the processing and fabricating procedures.

This invention overcomes the aforementioned inadequacies of previous plastic formulations containing trichloroethyl phosphate or other halogenated aliphatic phosphoric acid ester to produce a plastic composition which is not only flame-resistant but also possesses good heat stability. In addition to these properties the plastic compositions of this invention have the further advantage of improved moldability as evidenced by reduced scorching during injection molding thus permitting the use of the plastic compositions in larger shots at high molding temperatures and in harder formulations having higher flow temperatures. The products of this invention possess better dimensional stability, greater hardness, lower water sensitivity and lower weight loss on heating or aging than the plastic compositions molded heretofore.

It is an object of this invention to provide a method for improving the properties of plastics containing halogenated aliphatic phosphoric acid esters.

It is another object of this invention to provide a method for improving the properties of plastics containing trichloroethyl phosphate.

It is another object of this invention to provide a method for improving the heat stability of cellulose acetate plastic compositions containing trichloroethyl phosphate.

It is another object of this invention to provide novel plastic compositions of improved properties.

It is a further object of this invention to provide novel plastics, containing halogenated aliphatic phosphoric acid esters, of improved properties.

It is a further object of this invention to provide novel, heat-stable, flame-resistant, trichloroethyl phosphate-containing cellulose acetate plastic compositions.

Further and additional objects of this invention will be apparent from the disclosure hereinbelow.

The objects of this invention are accomplished by incorporating in plastic compositions containing a halogenated aliphatic phosphoric acid ester as a plasticizer a sufficient amount of a nonvolatile, compatible, epoxy-type compound to render the plastic compositions heat-stable. Throughout this disclosure trichloroethyl phosphate will be employed to describe the details of the invention since it is the preferred phosphoric acid ester. The invention, however, is applicable to plastic compositions containing halogenated aliphatic phosphoric acid esters generally. The advantages of practicing this invention are apparent from the specific examples which can be regarded as illustrative of this invention.

*Examples 1–6*

A series of runs was made to determine the heat stability of unstabilized cellulose acetate containing trichloroethyl phosphate and of similar compositions stabilized with various epoxy-type compounds. In the following table all compositions are in parts by weight.

The heat stability of the various compositions was determined by exposure of the compositions at 200° C. A 2.0 gram sample of each composition was placed in a test tube closed with a rubber stopper containing a capillary glass tubing. The test tube was then placed in a diethylene glycol-water bath maintained at 200° C. It was determined that, when the sample had taken on a dark amber color, it had been badly degraded, and the length of time each sample was in the bath before assuming a dark amber color was noted.

| Run | 1 | 2 | 3 | 4 | 5 | 6 |
|---|---|---|---|---|---|---|
| Cellulose acetate | 70 | 70 | 70 | 70 | 70 | 70 |
| Trichloroethyl phosphate | 30 | 30 | 30 | 30 | 30 | 30 |
| Epon 1164 | | | 5 | | | |
| Epon RN-34 | | | | 3 | | |
| Epon RN-48 | | | | | 2 | |
| Stabilizer A-5 | | | | | | 3 |
| Epiphenylin | | | | | | 1 |
| Number of minutes before bad degradation occurred | 20 | 30–45 | 30 | 30 | 30 | 30 |

NOTE.—Epon 1164, Epon RN-34, and Epon RN-48 are epoxy-type resin condensation products of epichlorohydrin and bisphenol produced by Shell Chemical Co. Stabilizer A-5 is an organic polyglycidyl compound produced by Carbide and Carbon Chemical Div.

*Examples 7–8*

Two runs were made wherein molding powders of the following compositions, after being compounded in a 2½ inch extruder, were employed in a 4-ounce injection molding machine (the compositions are shown in parts by weight):

| Run | 7 | 8 |
|---|---|---|
| Cellulose acetate | 75 | 72.7 |
| Trichloroethyl phosphate | 9 | 8.9 |
| Triphenyl phosphate | 8 | 8.8 |
| Diethyl phthalate | 8 | 7.9 |
| Epoxy-type stabilizer | 0 | 1.8 |

NOTE.—The stabilizer was Epon RN-48, an epoxy-type resin condensation product of epichlorohydrin and bis-phenol produced by Shell Chemical Co.

The composition employed in Run 8 was more dimensionally stable and more heat-stable and it had a higher flow temperature and a greater impact strength when compared with the composition used in Run 7.

In general, any nonvolatile exopxy-type compound compatible with the plastic composition can be employed in practicing this invention. The epoxy-type compound is high boiling and of only low volatility at the compounding or molding temperature of the plastics composition. Actually, the epoxy-type compound a boiling point substantially above the temperature employed in compounding or molding the plastics composition. The term "epoxy-type compound" is intended to mean an organic compound containing at least one epoxide grouping. Epoxy-type compounds that can be used are epoxidized oils for example, peanut oil, corn oil, cottonseed oil, soybean oil, and the like. Epoxy-type resin condensation products of glycidol and bis-phenol, and, if desired, a compound, such as epiphenylin (glycidyl phenyl ether), can be used. However, it is preferred not to employ this latter compound because of its toxic nature. The preferred epoxy-type compounds are resin condensation products of epichlorohydrin and bis-phenol. The resins resulting from the condensation contain epoxy groups and they are particularly suitable for this invention. When the plastics composition is to be processed and fabricated with the use of heat, the epoxy-type compound should have a boiling point substantially above the processing or fabricating temperature. For example, in molding or other similar types of fabricating operations, it is well known to employ a minimum temperature of about 350° F. The boiling point of the epoxy-type stabilizing compound that can be employed in such heat treatment should be substantially above 350° F. and preferably not lower than 400° F. It will be quite apperent that epoxy-type compounds having a lower boiling point can be used when the fabricating or processing temperature is lower than 350° F. Thus, for example, styrene oxide was found to be an unsuitable stabilizing compound when used in plastic compounding procedures at elevated temperatures. The reason for the unsuitability of the styrene oxide is attributable to its relatively low boiling point of about 375° F. However, when used in compounding and fabricating procedures employing a considerably lower temperature, the styrene oxide is suitable.

The preferred epoxy-type compounds of this invention, as indicated above, are resin condensation products of epichulorohydrin and bis-phenol. Any of the known procedures for condensing these compounds to produce a condensate containing epoxy groupings can be used. A suitable procedure for preparing these resins involves the interaction of epichlorohydrin and bis-phenol in equimolar proportions in the presence of an aqueous caustic solution. Moderate temperatures can be used to effect the reaction, and, in some instances, slightly elevated temperatures are employed. To be effective in the practice of this invention, the resulting compound or other similar stabilizer must contain at least one epoxy grouping.

The amount of epoxy-type compound that is employed is variable and dependent upon various factors such as the degree of heat stability desired in the plastic composition, the epoxy-type compound that is employed, the manner in which the plastics composition is to be fabricated or processed, the amount of trichloroethyl phosphate in the composition, and the like. In general, a sufficient amount of stabilizing epoxy-type compound should be used to produce the desired heat stability, and with the preferred stabilizing agent at least 10% by weight based upon the amount of trichloroethyl phosphate is employed. However, it will be understood that, in some instances, adequate heat stability can be imparted to the plastic compositions with lesser amounts of stabilizing compound. For example, it has been found that cellulose acetate molding powders containing trichloroethyl phosphate can be adequately stabilized with about 7% by weight (based on the trichloroethyl phosphate) of epiphenylin. However, as indicated above, the toxic nature of this stabilizing compound is the reason for its being a nonpreferred compound for this invention. The maximum amount of stabilizing agent that can be employed is generally governed by the compatibility of the stabilizing agent with the plastic composition. To be effective it is essential that the stabilizing agent be at least somewhat compatible with the plastic composition, and this property serves to determine the upper concentration of plasticizing agent that is ordinarily used. In most instances it will be desirable to employ more than the minimum amount of stabilizing agent in order to provide a suitable safety factor, and in most instances, depending upon the type of plastic composition and the specific epoxy-type compound, as much as 50% by weight and more (based upon the trichloroethyl phosphate) can be used. The specific amount of stabilizing agent that will provide the optimum or desired heat stability in any particular instance is readily determinable by the simple expedient of a heat stability test similar to that employed in the above specific examples.

The epoxy-type compounds described in detail above are effective for stabilizing any plastic composition rendered flame-resistant by the incorporation therein of trichloroethyl phosphate. The preferred plastic composition is cellulose acetate, but the invention is also applicable to other plastic compositions, for example, ethyl cellulose, cellulose acetate butyrate, and other cellulose derivatives can be used in addition to such resinous plastics as the vinyl chloride and vinyl acetate types of plastic compositions. As indicated above the cellulose acetate plastics are preferred, but effective and desirable results can be obtained with other plastics containing trichloroethyl phosphate as a plasticizing compound. Suitable cellulose acetates have a substitution equivalent to between 52% and 60% combined acetic acid and a viscosity less than 600 seconds. Cellulose acetates having a substitution equivalent between 52% and 57% combined acetic acid and a viscosity not over 100 seconds are preferred.

Any of the known types of compounding a plastic composition can be used to incorporate the epoxy-type compound of this invention in the plastic itself. One such procedure involves mixing the plastic flake, trichloroethyl phosphate, epoxy-type stabilizing agent, and any other plasticizing agent, and the resulting mixture is then dried in a circulating oven or other suitable drier. The dried mixture is then passed through a suitable extruder for completion of the compounding. If desired, mixing of the various ingredients can be accomplished by means of simple stirring, and it will be apparent that various types or sizes of extruders can be used in the compounding procedure. In another type of compounding, the plastic flake, plasticizer and stabilizing agent are colloided in paste form using a suitable solvent, and subsequently the bulk of the solvent is removed by rolling the paste on a two-roll mill at a suitably elevated temperature. The sheet obtained from the two roll-mill is cured in a circulating air oven or similar apparatus, and after curing, the sheet is ground into a molding powder which is then ready for fabrication into the desired finished article. In still another procedure the mixture of plastic, plasticizer and stabilizing agent can be colloided on a pair of differential speed rollers maintained at an elevated temperature, such as by steam pressure. The mixture issuing from the rolls is then ground or otherwise comminuted into a molding powder.

The amount of trichloroethyl phosphate or other halogenated aliphatic phosphoric acid ester that is used to plasticize the plastic compositions is variable, and, in general, it is governed by the degree of flame resistance desired in the final product. The specific amount of plasticizer that will provide the optimum or desired flame resistance in any particular instance is readily determinable by the simple expedient of a flame test wherein one end of a test specimen of the plasticized plastic is ignited with a flame and the period of time required for self-extinction of the flame is observed. The flame tests employed in determining the amount of trichloroethyl phosphate required were quite critical, and anyone with a less critical viewpoint or intended application may find that lesser amounts of trichloroethyl phosphate are needed. In some instances as little as 8% by weight and less of the plastic composition is trichloroethyl phosphate, particularly when other flame-resistant plasticizing agents are present in the composition. When no flame-resistant coplasticizers are employed or when the coplasticizers are not flame-resistant, at least 10 to 15% by weight of the final product should be trichloroethyl phosphate in order to obtain good flame resistance. It will be apparent that the trichloroethyl phosphate can be used in amounts in excess of those expressed above, for example, say 30 to 40% by weight of the plastic composition, but, as already indicated, the amount actually used will be governed by the desired flame resistance. In addition to the trichloroethyl phosphate, the plastic composition can contain other plasticizing agents which may or may not impart flame resistance to the final product. Any acceptable plasticizer for cellulose acetate can be used as a coplasticizer in conjunction with trichloroethyl phosphate. Typical examples of such coplasticizers are triacetin, camphor, triethylene glycol diacetate, diallyl phthalate, dimethoxy ethyl phthalate, triethyl citrate and phenyl salicylate. When nonflame-resistant coplasticizers, for example, dimethyl phthalate and diethyl phthalate, are employed, relatively high concentrations of trichloroethyl phosphate are required to obtain the desired flame resistance in the final product. When such coplasticizers are wholly or partially replaced by a flame-resistant type of plasticizer, for example, triethyl phosphate or triphenyl phosphate, the desired degree of flame resistance in the final product can be obtained with lesser quantities of trichloroethyl phosphate. The amount and type of coplasticizer that is used will be quite largely governed by the desired properties in the final product and the use to which this product will be subjected.

It has been observed that, when coplasticizers are employed, the final product is more stable thermally than a product containing trichloroethyl phosphate as the sole plasticizer. This observation was made by noting the heat stability of a plastic composition containing 70 parts by weight of cellulose acetate and 30 parts by weight of trichloroethyl phosphate and if similar compositions wherein 50% of the plasticizer was replaced by one of the following coplasticizers: diethyl phthalate, triphenyl phosphate, triacetin, camphor, diallyl phthalate and phenylsalicylate. The presence of these coplasticizers markedly increased the stability of the plastic composition. The data in specific Examples 1–8 above demonstrate that the presence of an epoxy-type stabilizer improves the properties of plastic compositions containing trichloroethyl phosphate as the sole plasticizer as well as those compositions containing a plurality of plasticizers, one of which is trichloroethyl phosphate.

The amount of coplastisizer that is used is dependent to a large extent upon the properties desired in the final product. The compositions of this invention contain at least the plastic material, trichloroethyl phosphate, and epoxy-type stabilizer. The flow temperature required in the product determines the percentage of plastic material to be employed, and with cellulose acetate the practical range is 60 to 80% of the product. The degree of flame resistance desired determines the percentage of trichloroethyl phosphate to be used. With flame-resistant coplasticizers at least 8% trichloroethyl phosphate is used, and when no flame-resistant coplasticizers are used, the minimum is about 14%. The amount of epoxy-type stabilizer that is used is determined by the percentage of trichloroethyl phosphate employed, and any unfilled percentage of the composition can be filled by any of the above-named coplasticizers or mixtures thereof.

Articles shaped from the plastic compositions described above are fire-resistant to a degree defined as self-extinguishing. This means that the articles, when ignited by a flame, will not continue to propagate the flame, but will extinguish themselves when the igniting flame is removed.

Various modifications within the scope of this invention will be apparent to those skilled in the art from the above disclosure.

What I claim and desire to protect by Letters Patent is:

1. In the compounding of a thermoplastic molding powder composition containing a thermoplastic cellulose derivative selected from the group consisting of cellulose ethers and cellulose esters and containing at least 8% by weight of trichloroethyl phosphate as a plasticizer, the improvement which comprises increasing the heat stability of said composition by adding at least 10% by weight, based on said trichloroethyl phosphate, of a resinous epoxy condensation product of epichlorhydrin and bisphenol having a boiling point in excess of 350° F. to said composition during the compounding step.

2. In the compounding of a thermoplastic molding composition containing cellulose acetate, at least 8% by weight of trichloroethyl phosphate as a plasticizer, and a coplasticizer selected from the group consisting of diethyl phthalate, triphenyl phosphate, triacetin, camphor, diallyl phthalate and phenyl salicylate, the improvement which comprises increasing the heat stability of said composition by adding a nonvolatile, compatible resinous epoxy condensation product of epichlorhydrin and bisphenol having a boiling point of at least 400° F. in an amount at least 10% by weight of said trichloroethyl phosphate to said composition during the compounding step.

3. In the compounding of a thermoplastic molding composition containing cellulose acetate, at least 8% by weight of trichloroethyl phosphate as a plasticizer, and triphenyl phosphate as a coplasticizer in an amount substantially enquivalent to the trichloroethyl phosphate, the improvement which comprises increasing the heat stability of said composition by adding a nonvolatile, compatible resinous epoxy condensation product of epichlorhydrin and bisphenol having a boiling point of at least 400° F. in an amount at least 10% by weight of said trichloroethyl phosphate to said composition during the compounding step.

4. In the compounding of a thermoplastic molding composition containing cellulose acetate and at least 14% by weight of trichloroethyl phosphate as the sole plasticizer, the improvement which comprises increasing the heat stability of said composition by adding a nonvolatile, compatible resinous epoxy condensation product of epichlorhydrin and bisphenol having a boiling point of at least 400° F. in an amount at least 10% by weight of said trichloroethyl phosphate to said composition during the compounding step.

5. As a composition of matter, a heat-stable cellulose acetate molding composition containing cellulose acetate, at least 8% by weight trichloroethyl phosphate as a plasticizer, a coplasticizer selected from the group consisting of diethyl phthalate, triphenyl phosphate, triacetin, camphor, diallyl phthalate and phenyl salicylate and a nonvolatile, compatible resinous epoxy condensation product of epichlorhydrin and bisphenol having a boiling point of at least 400° F. in an amount at least 10% by weight of said trichloroethyl phosphate.

6. As a composition of matter, a heat-stable cellulose acetate molding composition containing cellulose acetate, at least 8% by weight trichloroethyl phosphate as a plasticizer, triphenyl phosphate as a coplasticizer in an amount substantially equivalent to the trichloroethyl phosphate, and a nonvolatile, compatible resinous epoxy condensation product of epichlorhydrin and bisphenol having a boiling point of at least 400° F. in an amount at least 10% by weight of said trichloroethyl phosphate.

7. As a composition of matter, a heat-stable cellulose acetate molding composition containing cellulose acetate, at least 14% by weight trichloroethyl phosphate as the sole plasticizer, and a nonvolatile, compatible resinous epoxy condensation product of epichlorhydrin and bisphenol having a boiling point of at least 400° F. in an amount at least 10% by weight of said trichloroethyl phosphate.

8. As a composition of matter, a heat-stable thermoplastic molding composition containing a thermoplastic cellulose derivative of the group consisting of cellulose ethers and cellulose esters, at least 8% by weight of trichloroethyl phosphate as a plasticizer, and a nonvolatile, compatible resinous epoxy condensation product of epichlorhydrin and bisphenol having a boiling point of at least 400° F. in an amount at least 10% by weight of said trichloroethyl phosphate.

9. As a composition of matter, a heat-stable thermoplastic molding composition containing cellulose acetate, at least 8% by weight of trichloroethyl phosphate as a plasticizer, and a nonvolatile, compatible resinous epoxy condensation product of epichlorhydrin and bisphenol having a boiling point of at least 400° F. in an amount at least 10% by weight of said trichloroethyl phosphate.

References Cited in the file of this patent

UNITED STATES PATENTS

| 2,181,100 | Slagh et al. | Nov. 21, 1939 |
| 2,330,251 | Taylor et al. | Sept. 28, 1943 |
| 2,333,577 | Koch | Nov. 21, 1943 |
| 2,341,673 | Walker | Feb. 15, 1944 |
| 2,371,500 | Britton | Mar. 13, 1945 |
| 2,453,634 | Marple | Nov. 9, 1948 |
| 2,467,171 | Werner et al. | Apr. 12, 1949 |
| 2,514,982 | Walters et al. | July 11, 1950 |
| 2,590,211 | Rugar | Mar. 25, 1952 |
| 2,670,302 | Malm | Feb. 23, 1954 |
| 2,675,327 | Gearhart | Apr. 13, 1954 |

FOREIGN PATENTS

| 506,999 | Great Britain | June 5, 1939 |